UNITED STATES PATENT OFFICE.

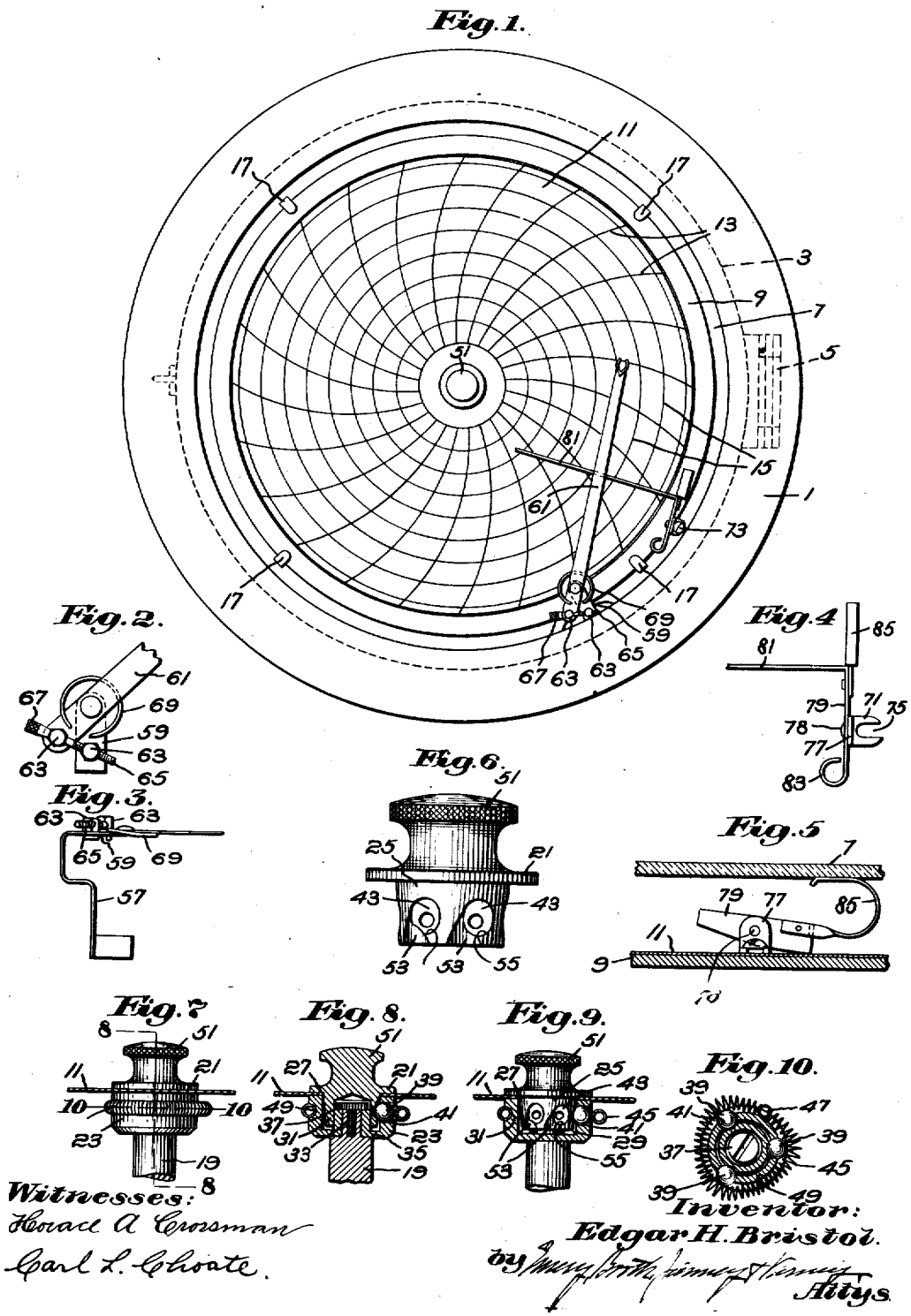

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

MEASURING INSTRUMENT.

1,290,890.      Specification of Letters Patent.      Patented Jan. 14, 1919.

Application filed November 9, 1914. Serial No. 870,982.

*To all whom it may concern:*

Be it known that I, EDGAR H. BRISTOL, a citizen of the United States, and a resident of Foxboro, Massachusetts, have invented an Improvement in Measuring Instruments, of which the following description, in connection with the accompanying drawings, is a specification, like characters on the drawings representing like parts.

This invention relates to measuring and recording instruments, and among other objects provides an improvement in means for detachably clamping a recording chart to a shaft; an adjusting device for causing the index to swing in line with radial graduations on the chart; and a device for lifting the index out of engagement with the chart and adapted automatically to be released from the index on the closing of the cover of the casing containing the chart.

The character of the invention may be best understood by reference to the following description of an illustrative embodiment thereof shown in the accompanying drawing, wherein:

Figure 1 is a front elevation of an illustrative instrument shown herein as embodying the invention equipped with the chart clamping device, the index adjusting device and the index lifting device;

Fig. 2 on an enlarged scale is a plan of the index adjusting device;

Fig. 3 is a side elevation of the device shown in Fig. 2 looking toward the left of said figure;

Fig. 4 on an enlarged scale is a plan of the index lifting device;

Fig. 5 is a side elevation of the device shown in Fig. 4 showing its coöperation with the cover of the casing;

Fig. 6 on an enlarged scale is a side elevation of a part of the chart clamping device;

Fig. 7 is a side elevation of the chart clamping device;

Fig. 8 is a vertical section taken on line 8—8 of Fig. 7;

Fig. 9 is a view partly in side elevation and partly in section of the clamping device; and Fig. 10 is a transverse section taken on line 10—10 of Fig. 8.

Referring to the drawing, 1 designates a casing for receiving the instrument provided with a cover 3 hinged thereon as at 5 and having a glass 7. Within the casing is a plate 9 for supporting a chart 11 provided with radial graduations 13 for representing divisions of time and circular concentric graduations 15 for representing divisions of pressure or other condition desired to be recorded. The chart may be slid freely beneath tabs 17 projecting from said plate 9.

To rotate the chart on the plate a shaft 19 is provided within the casing adapted to be driven by a time train unnecessary to show herein. To secure the chart to this shaft a clamping device is provided comprising two clamping members 21 and 23 having opposed clamping faces which abut respectively against the front and back surfaces of the chart. The member 21 is provided with a boss 25 projecting through a central perforation 27 in the chart and into a recess 29 provided in the member 23 and extending into the latter from the clamping face thereof. This boss is provided with a slightly tapered portion 31 which enters the perforation in the chart and accurately centers the latter. The member 23 is secured to the shaft 19 in any suitable manner, herein by providing said shaft with a reduced end 33 having a shoulder 35 against which said member is seated. A lock screw 37 is threaded into a bore in said reduced end 33 to prevent rotation of the member 23 thereon.

It will be observed that the member 23 has no part whatever projecting through the perforation in the chart. When the member 21 is removed the front end or clamping face of the member 23 lies substantially in the same plane as the front face of the chart supporting plate 9 or, in other words is flush therewith. This makes it possible to slide the chart into position across the face of said plate beneath the recording index, to be referred to, without materially disturbing the latter.

The members 21 and 23 are provided with suitable yielding means carried by one of them interengaging with the other to clamp the chart between the opposed clamping faces of the two members. As shown herein this means comprises one or more balls or rounded elements 39, herein three in number, located in suitable lateral pockets 41 provided in the member 23 and entering suitable lateral depressions 43 provided in the boss of the member 21. These balls are normally urged toward said depressions by suitable yielding means typified herein as a helical band-like spring 45 having its ends hooked together as at 47 (Fig. 10). This spring engages all three of the balls 39 and is located in a circumferential groove 49 in the member 23, which groove serves to prevent the spring from slipping up or down on the latter. Herein the depressions 43 are of conical form and are so placed that the balls engage the conical surfaces on the sides nearest to the inner end of the boss 31 as will be evident by reference to Fig. 8. It will be obvious that the inward pressure of the balls on these inclined surfaces will tend to draw the member 21 inwardly with respect to the member 23 and accordingly the chart will be clamped between the clamping faces of the two members by spring tension.
This has the advantage of providing for a uniform clamping action on the chart as compared with the use of a screw for this purpose.

The member 21 is provided with a knurled head 51 by means of which it may be readily manipulated with the fingers.

The clamping device thus far described is substantially similar to the one disclosed in Letters Patent No. 1048804 granted to me December 31, 1912. An important feature of the present invention relates to the provision of means facilitating the introduction of the balls to and their removal from the depressions 43. To accomplish this the boss is provided with grooves or ways 53 leading to the depressions 43. These grooves are milled in the tapered boss parallel to the surface thereof and consequently the axial lines of the grooves incline inward toward the axis of said boss. The grooves laterally communicate with said depressions leaving shoulders 55 on said depressions which will be effective to receive the bearing force of the balls and resist a direct withdrawal of the clamping member 21 in the direction of the axis of said members.

When it is desired to clamp a chart between the members the boss of the member 21 is inserted in the recess in the member 23 with the guide grooves 53 presented to the balls. A very slight pressure on the member 21 toward the member 23 will cause the balls to follow along said guideways and spring into said depressions, seating themselves against the shoulders 55 and locking the member 21 against withdrawal from the member 23. In the course of the passage of the balls along said guideways there will of course be a slight rotative movement imparted to the member 21. There is therefore a slight screwing of one member into the other, but when the balls are seated against these depressions there is no screwing action, but on the contrary one member is yieldingly drawn into the other securely to clamp or grip the chart to the time train driven shaft. This pressure is always the same. Consequently successive charts are clamped to the shaft with equal force.

When it is desired to separate the members to permit the removal of the chart the member 21 is given a slight pull outward away from the member 23 accompanied by a slight rotative movement. This will dislocate the balls from the shoulders of the depressions and permit them to freely follow out through the oblique guideways.

These guideways facilitate the ease with which the clamping members may be assembled and separated and greatly reduce the wear on the parts and prolong the life of the device. They facilitate the passage of the balls to and from the depressions without in any way decreasing the effectiveness of the locking engagement of the balls with the depressions. The inward inclination of the grooves enables the balls to be gradually pressed outward in their pockets until they reach the depressions, whereupon they jump therein.

Next will be described the device for adjusting the index so that the pen point thereof will swing radially across the chart parallel to the radial graduation lines on the chart and insure an accurate record. In Figs. 2 and 3 is shown an arm or support 57 adapted to be connected to a shaft (not shown) for swinging the index across the chart to register and record pressure, temperature or other condition. Said support is formed to present a portion 59 substantially parallel to the chart. On the end thereof is pivoted an index 61 preferably of resilient material carrying at its end a pen for making the record on the chart. To set the index in different positions of adjustment relatively to the arm 57, each is provided with a lug conveniently in the form of a bolt 63 pivoted thereon. A screw 65 is entered loosely through an eye in one of these lugs and threaded into an eye in the other and has a head 67 for limiting the sliding of the index lug along the screw. A spring typified herein as a wire coil 69 is provided having one end secured to said support and the other end secured to the index. This spring tends to turn the index on its pivot and swing the index lug away from the support lug sliding the former along the screw into engagement with the head 67 thereof. To adjust the index relatively to the support the screw 67 is turned, thereby causing the lugs to approach or recede from one another as desired. The spring causes the index to follow the head of the screw in whatever position the screw may be placed.

Before a chart is removed from its supporting plate the index should be adjusted up away therefrom to prevent its making a line on the chart during its withdrawal.

To accomplish this a lifting device is provided (Figs. 4 and 5) comprising a bracket 71 secured to the plate 9 by a screw 73 entered through an open ended slot 75 in said bracket. On a lug 77 of said bracket is a pin 78 on which is pivoted a lever 79 having an arm or finger 81 adapted to project between the index and chart and substantially radially toward the center of the latter. To facilitate the rocking of the lever about its pivot it may be formed to present a handle 83. A spring typified herein as a leaf spring 85 has one end secured to said lever and its other end reversely bent outward and back toward said lever in substantially U-shaped form. The pin 78 draws the lever against the bracket lug 77 with sufficient friction to hold the lever in its different positions of adjustment.

In use when it is desired to remove a chart the handle 83 is pressed toward the plate 9, thereby lifting the finger 81 away from said plate and said finger in turn lifts the index up out of engagement with the chart. It is important after a new chart is inserted into the casing that the index pen should rest on the chart in readiness to make a record thereon. By the device described this is automatically accomplished on the closing of the cover of the casing. The cover when closing engages the spring 85 and rocks the lever 79 until limited by its engagement with the chart supporting plate, thereby causing the finger 81 thereof to move toward the plate 9 and permit the index to rest on the chart. The yielding of the spring provides for lost motion between the index-supporting end of the lever and the cover and permits a complete and secure closing of the latter.

Having described one illustrative embodiment of the invention without limiting the same thereto, what I claim as new and desire to secure by Letters Patent is:

1. In an instrument of the class described, the combination of opposed clamping members, one having a projection for entrance into a recess of the other, pockets in the wall of said recess, depressions in said projection, balls in said pockets, a band-like spring for pressing said balls toward said depressions, and grooves oblique to the axis of said projection for guiding the balls into said depressions.

2. In an instrument of the class described, the combination of opposed clamping members for receiving a record sheet between them, and means to secure said members together including a spring pressed ball on one for entrance into a depression on the other and a groove oblique to the axis of said members for guiding said ball to said depression.

3. In an instrument of the class described, the combination of opposed clamping members for gripping a record sheet between them, and means detachably to secure said members together including spring pressed rounded elements on one for entrance into depressions on the other and grooves oblique to the axis of said members for guiding said rounded elements into said depressions.

4. In an instrument of the class described, the combination of opposed clamping members for gripping a record sheet between them, and means for detachably securing said members together including rounded elements in one and depressions in the other for receiving said rounded elements and presenting shoulders for resisting direct axial separation of said members and guideways for conducting said rounded elements into locking engagement with said shoulders.

5. In an instrument of the class described, the combination of a support, an index pivoted thereon, lugs pivotally connected to said index and support, a screw loose in an eye in one of said lugs and threaded into an eye of the other, a head on said screw, and a spring connected to said index and support tending to slide one of said lugs along the screw against said head.

6. In an instrument of the class described, the combination of a support, an index pivoted thereon, and means for holding said index in different positions of pivotal adjustment relative to said support including spring means tending to rotate said index about its pivot, a fixed rotatable member, and an adjustable screw pivoted on the index and connecting it with said member for resisting the rotation of said index, the screw being slidably engaged with one of the connected elements and threaded into the other.

7. In an instrument of the class described, the combination of a support, an index pivoted thereon, and means for holding said index in different fixed positions of adjustment relative to said support including a spring coil having its ends secured to said index and support the diametrical expansion of said coil tending to move said parts relatively, and a screw connected to said index and support with provision for adjusting one relatively to the other against said spring.

8. In an instrument of the class described, the combination of a bracket, an arm pivoted thereon having a finger for lifting a recording index out of engagement with a chart and spring means on said arm adapted to be engaged by the cover of the instrument to automatically rock the arm and permit the engagement of the index with the chart on the closing of the cover.

9. The combination of a bracket with an arm pivoted thereon adapted to be rocked to lift an index away from the chart, and spring means for said arm for transmitting a rocking movement thereto from the cover of the instrument to permit the return of the index to the chart.

10. An index lifting device comprising a bracket, a lever pivoted intermediate its ends on said bracket having an arm for engagement with an index, a handle for rocking said lever, and a spring connected to said arm for engagement with the cover of the casing.

11. In an instrument of the class described, a casing, a cover therefor, a record sheet support and an index adapted to move over a record sheet associated with said casing, and means for lifting the index out of engagement with the record sheet comprising a lever pivoted to said casing and having an arm for engagement with the index, a portion of said lever being disposed in the path of the cover whereby the closing of the cover will actuate the lever to permit the return of the index to the record sheet.

12. In an instrument of the class described, a casing, a cover therefor, a record sheet support and an index adapted to move over a record sheet associated with said casing, and means for lifting the index out of engagement with the record sheet comprising a lever pivoted to said casing and having an arm for engagement with the index, said lever presenting a lost motion device in the path of said cover through which the closing of the cover actuates the lever to permit the return of the index to the record sheet.

13. In an instrument of the class described a casing having a dial to support a circular chart and an index pivoted to swing toward and from the center of the dial, said index normally engaging the chart, a door for the casing to cover the dial and means independent of said door whereby the index may be lifted from the dial when the door is open, said means adapted to be engaged by said door in its closing movement for lowering the index toward the dial when the door is shut.

In testimony whereof, I have signed my name to this specification, in the presence of two subscribing witnesses.

EDGAR H. BRISTOL.

Witnesses:
HENRY T. WILLIAMS,
ROBERT H. KAMMLER.